Sept. 17, 1957     H. H. BRUDERLIN     2,806,679
ICE CREAM FREEZER
Filed Aug. 5, 1952
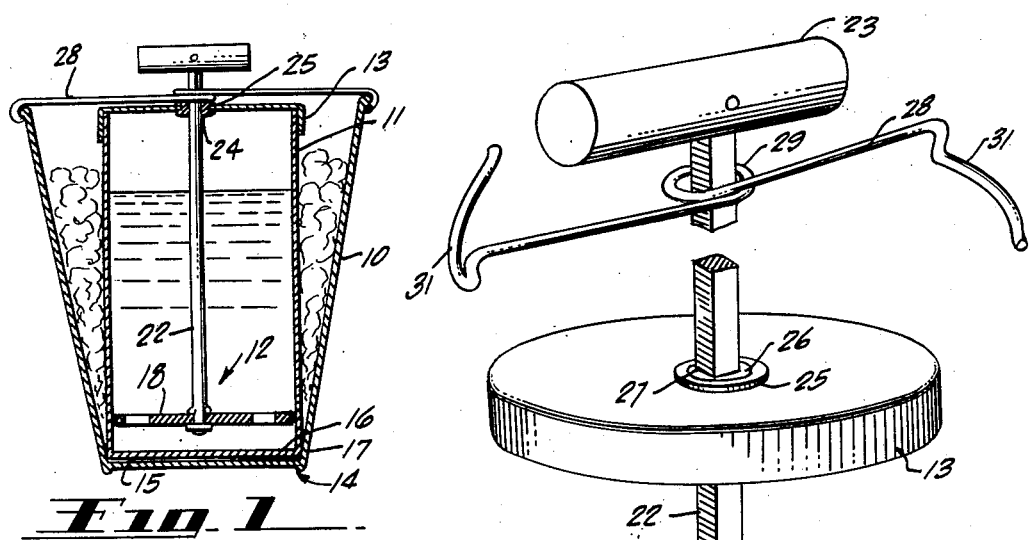
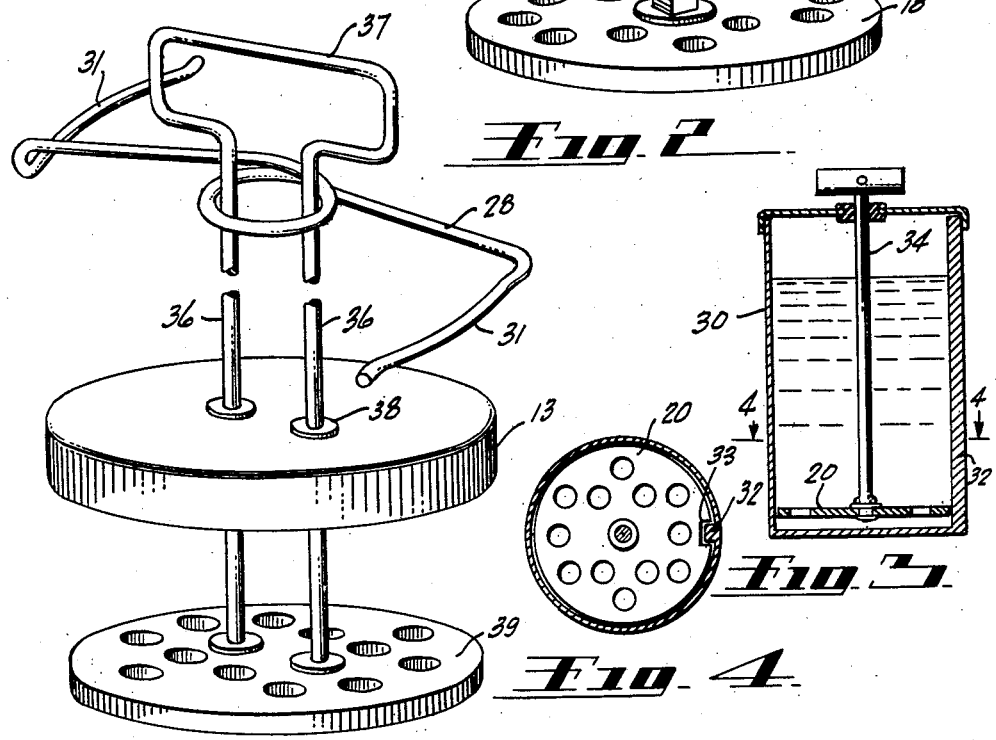
INVENTOR.
HENRY H. BRUDERLIN
BY J. Edwin Coates
ATTORNEY.

US. United States Patent Office 2,806,679
Patented Sept. 17, 1957

2,806,679

ICE CREAM FREEZER

Henry H. Bruderlin, Beverly Hills, Calif.

Application August 5, 1952, Serial No. 302,792

8 Claims. (Cl. 259—71)

This invention relates to mixers and freezers for frozen confections such as ice cream, and particularly to domestic, hand-operated ice cream freezers.

Freezers of this general class have been reduced to a more or less standardized form that usually includes a wooden tub in which is rotatably mounted a rather heavy, cumbersome freezer can rotatably pivoted at its lower end to the tub by means of a pin and socket arrangement.

The can coaxially contains a multi bladed dasher which is held stationary by contact with an overhead bar while the can itself is rotated relative to the dasher and the tub by a cumbersome gear train and a rotary handle extending generally laterally from the freezer assembly. The refrigerant, usually an ice and salt mixture, is packed in the peripheral space between the can and the tub.

The peripheral space just mentioned is rather large in volume and lateral extent and requires the use of large quantities of ice and salt, in fact a great deal more than is actually needed to freeze the quantity of ice cream being made. The large area of exposure of the upper surface of the ice-salt mixture and of the exterior tub wall results in unduly large heat transfer and consequent excess melting of the ice.

The excessively large size and complication of conventional freezers for the amount of ice cream to be made, even though the parts are rather crude, makes the cost of such freezers unduly high and correspondingly reduces their marketability and desirability for domestic use.

The present invention obviates the various disadvantages set out above by means of the novel construction and arrangement of parts hereinafter described in detail. It produces a given amount of ice cream in less than half the time ordinarily required, using only about one third as much ice-salt mixture and eliminates entirely the complicated conventional dasher and rotary gear train. Moreover it can be made of relatively light and inexpensive materials, reducing both cost and inconvenience.

The outer tub is made of sheet metal rather than wood or plastic as it has been discovered that the cold outer surface of the can quickly builds up a frost layer which serves very effectively as insulation. The tub has a frusto-conical shape with the smaller end down and the freezer can is cylindrical and has an outer diameter just slightly smaller than the smallest inside diameter of the tub so that it rests directly on the bottom and is held substantially centered by its contact with the wall of the tub, thus eliminating special centering and pivoting devices.

A simple perforated dasher is carried for vertical movement by a rod extending up through the lid of the freezer can, the upper end of the rod being provided with a manipulating handle. Vertical movement of the dasher furnishes the necessary agitation, and rotation of the handle with a torque transmitting coupling to the can furnishes the necessary rotary movement of the can for scrubbing action against the ice-salt mixture.

The volume of space for the brine and ice is reduced to a minimum by the fact that the radial clearance between can and tub is almost zero at the bottom and increases gradually to a rather small dimension at the top. Despite this small volume, more than adequate freezing power is available.

Because the agitating and rotating operations are independent of each other it is possible to judge the consistency of the mix by its resistance to movement of the dasher without being misled by resistance of the can to rotation resulting from binding in the ice-salt mixture.

Various other advantages and features of novelty will become apparent as the description proceeds. Several of the presently preferred forms of the invention are illustrated in the accompanying drawing in which:

Figure 1 is a vertical, substantially central section of one of the embodiments of the freezer;

Figure 2 is a fragmentary perspective view showing all the components of the freezer except the tub and the can thereof, and including the novel dasher with the can lid thereon, together with the clamp-means for securing the lid to the can in a novel manner;

Figure 3 is a vertical, substantially central section of a variant of the can and dasher unit;

Figure 4 is a cross section on line 4—4 of Figure 3, taken to show the novel mutual interlock of the can and the dasher; and Figure 5 is a view similar to Figure 2 and showing a variant of the dasher operating means and of the engagement of the dasher shank with the can lid.

In all forms of the invention it essentially comprises a tub 10, configured in a novel manner, later particularized, to a can 11, which is, in at least one of its forms, combined in a novel way with a unique dasher unit 12. This dasher is combined in a novel manner with a lid 13 for the can, which lid is a tight fit thereon. Thus although the freezer fundamentally comprises substantially the same functional elements as does the conventional freezer each of these elements is, as hereinafter made manifest, materially modified, structurally and operationally, to enable them to so co-act with the refrigerant or with the mix to be "frozen" as to overcome the contemporary deficiencies pointed out above.

More specifically, the tub comprises a hollow, frusto-conical body, preferably fabricated of some such sheet material as steel or aluminum, occupying a geometrically inverted attitude and resting on its truncate, smaller, closed end 14, the opposite end remaining open. The angle of taper of the sides of the truncated cone with respect to the vertical is such, as best seen in Figure 1, as to enable the tub wall to fairly closely fit the periphery of the lower end of a coaxially disposed standard size, open-top, hollow, cylindrical freezer can 11, such as a 1½ quart can. The can is fabricated of tinned iron or steel sheet, or of aluminum. The bottom inner face 15 of the tub is planeal and bare, being devoid of the usual can-centering and restraining pivot pin or the like for fitting into an aperture, or depression, in the bottom of the can.

The present can lacks such depression and its lower end portion 16 fits congruently and concentrically into the lower end portion 17 of the tub, being peripherally contacted, and restrained against substantial lateral movement, by the adjacent wall of the tub. Rotation of the can about its vertical axis and reciprocation of the dasher effect practically no displacement of the can.

The dasher coaxially mounted in such can comprises an operating head 18 of the "churn" type and including a plurality of perforations 19 for enabling the head to pass easily through the mix, at the same time locally reciprocatingly agitating the mix in locuses thereof thereby to accelerate freezing. Preferably, the diameter of the head is only slightly less than the maximum diameter of the can to scrape frozen mix from the inside wall.

In the illustrative forms of the invention illustrated in Figures 1 and 2 the dasher head is reciprocated in the can by means of manual operation of a handle which consists of a rectangular section shank 22 attached at its lower end to the head, passing upwardly thru the can lid and terminating outwardly of the freezer in a hand grip 23 extending transversely of the bar. In the form illustrated, this hand grip consists of a length of rod stock centrally counterbored and pinned to the bar. However, in furtherance of the concept of rendering it possible to fabricate the freezer entirely of sheet material, the head, shank and hand grip of the dasher may well be fabricated from sheet metal in any well known manner.

The lid 13 of the can is also fabricated of sheet metal and fits sufficiently tightly around the periphery of the open end of the can to be able to transmit horizontally acting torque to the body of the can so as to axially rotate the latter in, and with respect to, the tub.

Seated in a central aperture 24 in the can lid is circular grommet 25 the central portion 26 of which is composed of a resiliently yieldable, tough and abrasion and shear resistant material such as a suitable elastomer. Located centrally of the grommet is a rectangular aperture 27 having dimensions enabling its sides to congruently and tightly fit the adjacent sides of the rectangular section dasher-shank passing concentrically therethrough. Torquing of the hand grip and dasher while same are disposed as shown in Figure 1 will therefore effect rotation of the can about its vertical axis.

In order to provide a guide and support for the upper end of the dasher unit and concurrently to secure the can lid and the can against vertical movement out of the tub, a single elongate piece of semi-rigid elastically deformable material such as a wire 28, is disposed diametrally of the upper end of the tub and is provided with portions 29 and 31 integrally configured therein for, respectively, guiding and restraining the dasher bar and concurrently contacting and anchoring the can lid and can in place in the tub and for clamping engagement with the beaded periphery of the open upper end of the tub to equilibrate all the elements of the article in concentric relationship.

The mix in the can, when the latter is of the order of one to two quarts capacity, can be reduced to the consistency of ice cream in a period of the order of four minutes by rapidly manually reciprocating the dasher while torquing the dasher right and left or by intermittently performing these operations. This result can be obtained in this limited period of time and with a smaller amount of salt and ice than usual, by virtue of the facts that the rotary motion imparted to the can by the torquing of the dasher continually brings all portions of the can surface into forceful scrubbing contact with the brine and ice and thus expedites the heat transfer from the mix to the ice. Also, since the cold outer surface of the metal tub soon becomes frosted from contact with the surrounding air, the tub soon becomes coated with an insulating layer reducing heat transfer through the tub to the can.

In Figures 3 and 4, the sheet metal can 30 is shown as having the usual side seam 32 enlarged radially inwardly sufficiently to constitute a sort of key or detent while the radially adjacent portion of the dasher head 20 is provided with an indentation 33 shaped and adapted to receive this key 32. The can may also be formed as a casting or the like with member 32 constituting an integral rib.

Thus, when the dasher is torqued by means of the handle, the head torque is translated by means of this interengagement into a rotary movement of the can about its vertical axis.

In this form of the invention, because of the key and slot construction, it is not mandatory that the shank 34 of the dasher be rectangular in cross-section and engage the can lid through a rectangularly apertured grommet body, and the shank 34 is here shown as a circular section rod but in order to apply torques in two longitudinally spaced locations along the length of the can so as to balance the rotary forces when the head is near the tub bottom, thereby to stabilize it, both said grommet arrangement and the key and slot arrangement may well be employed.

The species shown in Figure 5 constitutes a variant of the lid and the dasher handle, including the shank and the hand grip, which is somewhat more inexpensive and readily fabricatable than are these parts in the other illustrated forms of the invention. As shown, these variants consist of a single length of fairly thick gauge wire, shaped to include a pair of substantially parallel upright portions 36 which are laterally spaced apart a distance sufficient to provide a can-torquing moment-arm. The upper portion of this wire is rectangularly looped to provide a hand grip 37.

The portion of the shank of this wire handle member that lies sub-adjacent the hand grip bears the looped medial portion 29 of the clamping and guiding wire 28 shaped, positioned and functioning as heretofore described in connection with that of Figure 2, the outer ends 31 of this wire of course being shaped to clamp under the bead on the periphery of the upper end of the tub.

The parallel "runs" 36 of the wire pass with a sliding fit thru the grommets 38 in the can lid to enable sealed reciprocation of the dasher 39 to which they are attached in substantially the same way as the rod 22 of Figure 1.

The freezer that includes the elements of Figure 5 is manipulated in the same manner as that of the other figures of the drawings and achieves the same improved results. Because of the wire-handled dasher, it is somewhat lighter than the preceding forms but is quite as durable and effective.

It will be apparent that various changes and modifications may be made in the construction and arrangement of parts above described without departing from the spirit of the invention and it is intended that all such changes and modifications shall be embraced within the scope of the following claims.

I claim:

1. A freezer for ice cream or the like, comprising: a hollow tub having an open top and a closed bottom, the inner surface of said bottom being bare and devoid of extraneous instrumentalities; the walls of said tub diverging upwardly; a freezer can in said tub; said can being of constant lateral dimensions throughout its length; a lid for said freezer can; and a reciprocatable and axially rotatable dasher mounted coaxially in said can and having a handle protruding through said lid and manipulatable to reciprocate and rotate said dasher; said freezer can being disposed coaxially of said tub and having its lowermost surface resting on the bare inner surface of the bottom of said tub, said lowermost surface being bare and devoid of auxiliary instrumentalities; and respective means forming a part of the lower portion of said tub and of the adjacent lower portion of said can mutually engaged to positively hold said can centered in said tub and restrained against lateral displacement independently of the aid of discrete auxiliary instrumentalities for so doing.

2. A freezer for ice cream or the like, comprising: a hollow tub having an open top and a closed bottom, the inner surface of said bottom being bare and devoid of auxiliary instrumentalities; a hollow freezer can having an open top and a closed bottom; a lid for said freezer can; and a reciprocatable and axially rotatable dasher mounted coaxially in said can and having a handle protruding through said lid and manipulatable to reciprocate and rotate said dasher; said freezer can being disposed coaxially of said tub and having its lower end resting on the bare inner surface of the bottom of said tub, said lowercost surface being bare and devoid of auxiliaries; said tub having a hollow frusto-conical conformation with the truncate, or smaller, end thereof down; the can being of cylindrical conformation and its lower end portion having a diameter substantially equal to that of the adjacent portion of said tub and being longitudinally congruent with the lower portion of said tub whereby the lower portions of said can and said tub radially and longitudinally mutually engage sufficiently to positively hold said can centered in said tub and restrained against lateral displacement.

3. In an ice cream freezer of the type described and including an open top tub having a beaded periphery, coaxially containing a can having a lid lying substantially planeal with said tub top, said can containing a dasher having a handle passing therethrough: means for concurrently laterally supporting and guiding said handle and anchoring said lid and can in said tub and comprising a single elongate piece of semi-rigid resilient material having a loop in its medial portion adapted to fit around the upper portion of said handle and said loop bearing firmly against the top of said lid, each of the ends of said piece of resilient material resiliently engaging under the adjacent portion of said bead.

4. A freezer for ice cream or the like as claimed in claim 1 in which said lid has a noncircular aperture therein and said handle has a corresponding noncircular cross section, whereby rotation of said handle will produce rotation of said lid to transmit said rotation to said can.

5. A freezer for ice cream or the like as claimed in claim 1 in which said lid has a plurality of spaced apertures therein and said handle has a plurality of similarly spaced vertically extending elements slidable therein, whereby rotation of said handle will produce rotation of said lid to transmit said rotation to said can.

6. A freezer for ice cream or the like as claimed in claim 1 in which said can is provided with a vertically extending rib on its inner wall and a cooperating keyway is formed in the periphery of said dasher to slidingly engage said rib, whereby rotation of said handle and dasher will cause rotation of said can in any vertical position of said dasher.

7. A freezer for ice cream or the like as claimed in claim 1 in which said handle comprises a length of rigid wire-like material reversely bent to form an upper, looped, hand grip portion and a pair of depending elements, the lower end of each element being secured to the dasher; said lid having a pair of apertures therein, and the intermediate portions of one of said depending elements slidably engaging in each of said apertures.

8. A freezer for ice cream or the like as claimed in claim 1 in which said handle comprises a plurality of vertically extending wire-like elements joined at their lower ends to said dasher and hand grip means joining the upper ends of said elements; said lid having a plurality of apertures therein, and the intermediate portions of one of said elements slidably engaging in each of said apertures.

References Cited in the file of this patent

UNITED STATES PATENTS

| 165,615 | Redheffer | July 13, 1875 |
| 207,581 | Williams | Aug. 27, 1878 |
| 514,095 | Schuyler | Feb. 6, 1894 |
| 607,409 | Falardeau | July 12, 1898 |
| 1,488,371 | Allison | Mar. 25, 1924 |
| 1,590,831 | Jones | June 29, 1926 |
| 2,291,708 | Gluck | Aug. 4, 1942 |

FOREIGN PATENTS

| 383,328 | Germany | Oct. 12, 1923 |
| 576,093 | France | Aug. 11, 1924 |